July 2, 1929.  A. O. MUELLER  1,718,971
DEVICE FOR SUPPORTING BRANCHES OF TREES
Filed June 4, 1928
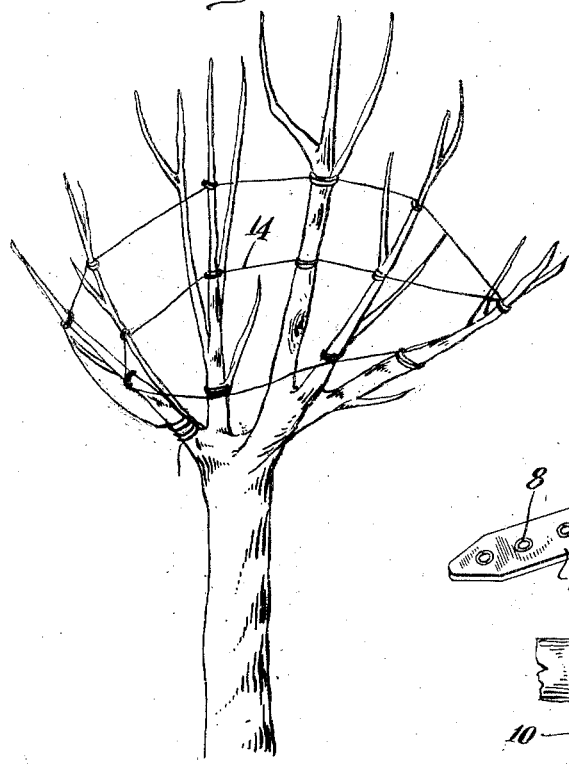
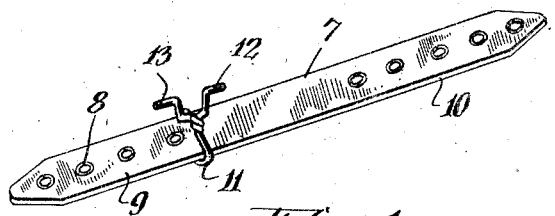
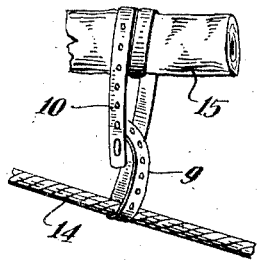
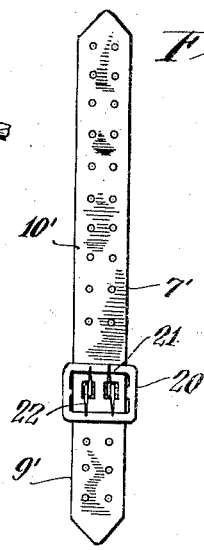
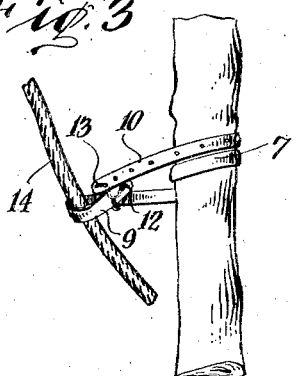
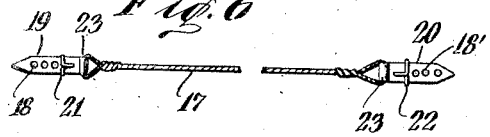
Inventor
Adelbert Oswald Mueller
By his Attorney Patented July 2, 1929.

1,718,971

UNITED STATES PATENT OFFICE.

ADELBERT OSWALD MUELLER, OF PRESHO, SOUTH DAKOTA.

DEVICE FOR SUPPORTING BRANCHES OF TREES.

Application filed June 4, 1928. Serial No. 282,541.

This invention pertains to a device for supporting and binding the branches of fruit trees and the like so that they will be held substantially rigid in strong winds.

It is a source of great loss to orchardists when strong winds shake their fruit trees and cause the fruit to fall to the ground, in many instances in an unripened condition. Such fallen fruit has practically no commercial value and thus represents a loss to the orchardist.

It is therefore an object of this invention to provide a strap which is adapted to be wound about a branch of a tree to hold it rigidly to a rope which is similarly connected to the other branches of the tree.

A further object is to provide a branch binding device which is simple in structure and which may be readily applied by unskilled persons.

These and other objects are attained by the novel construction, combination and arrangement of parts, hereinafter described and shown in the accompanying drawing, constituting a material part of this disclosure, and in which:—

Figure 1 is a perspective view showing the branches of a tree bound in accordance with this invention.

Figure 2 is a perspective view of the strap.

Figure 3 is a view showing the manner in which the strap is attached to a branch of a tree.

Figure 4 is a view showing a step in the process of attaching a strap to a branch.

Figure 5 shows a modified form of strap which may be used.

Figure 6 is a plan view showing another modification of the invention.

Referring to the drawings, in Figure 2 is shown a strap 7 which has a plurality of perforations at each end. Positioned intermediate of the length of the strap and nearer the end 9 than the end 10, is a wire 11 twisted about the strap, and having its ends 12 and 13 bent in opposite directions so that they may be readily engaged by perforations in the strap.

In operation, the long end 10 of the strap is wound about a branch of a tree and the end 13 of the wire 11 passed through one of the perforations 8 in the end 10 of the strap. The short end 9 of the strap is then passed around a rope 14 and under end 10 of the strap so that the end 12 of the wire may engage a perforation 8 in the end 9 of the strap. See Figures 3 and 4.

The rope 14 is passed from branch to branch of the tree, each branch being provided with a strap 7 and in this manner all of the branches of the tree are held rigidly together so that they will not sway separately in winds.

In Figure 5 is shown a modified form of strap, in which a strap 7' is provided with a plurality of perforations and has a short end 9' and a long end 10'. The wire 11 is shown in Figure 2 but as shown in Figure 5, the same is replaced by a buckle 20 having prongs 21 and 22 corresponding to ends 12 and 13 of wire 11.

In the modification shown in Figure 6, a piece of rope 17 has looped extremities engaged by the bent over portions 23 of the straps 19 and 20, the latter corresponding to the portions 9 and 10 of the strap shown in Figure 2. Straps 19 and 20 are provided with holes 18 and 18' and wire hooks 21 and 22, respectively. In application, the rope section 17 is wound around a branch and the straps 19 and 20 are passed around a rope 14, this wire hook 22 passing through the holes 18 in strap 19 and the hook 21 entering the holes 18' in strap 20.

The foregoing disclosure is to be regarded as descriptive and illustrative only and not as restrictive or limitative of the invention, of which obviously an embodiment may be constructed, including many modifications, without departing from the general scope herein indicated and denoted in the appended claims.

Having thus described my invention, what I claim as new and desire to secure by Letters Patent, is:—

1. A device for rigidly holding a branch of a tree to a binding rope, comprising a strap having a series of perforations at each of its ends, and a wire twisted about an intermediate portion of the strap, the ends of the wire being bent in opposite directions so that they may be conveniently passed through perforations in the strap.

2. A device for rigidly holding a branch of a tree to a binding rope, comprising a strap having a short end adapted to be passed around a rope, and a long end adapted to be passed around a branch of a tree, a wire twisted about the strap and positioned near the short end of the strap, and means associated with the strap for connecting the ends of the straps to the ends of the wire.

In witness whereof I have affixed my signature.

ADELBERT OSWALD MUELLER.